(12) United States Patent
Sekiyama et al.

(10) Patent No.: US 10,599,978 B2
(45) Date of Patent: Mar. 24, 2020

(54) WEIGHTED CASCADING CONVOLUTIONAL NEURAL NETWORKS

(71) Applicant: International Business Machines Corporation, Armonk, NY (US)

(72) Inventors: Taro Sekiyama, Urayasu (JP); Masaharu Sakamoto, Yokohama (JP); Hiroki Nakano, Otsu (JP); Kun Zhao, Funabashi (JP)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 15/802,585

(22) Filed: Nov. 3, 2017

(65) Prior Publication Data

US 2019/0138888 A1    May 9, 2019

(51) Int. Cl.
| | |
|---|---|
| *G06K 9/62* | (2006.01) |
| *G06N 3/04* | (2006.01) |
| *G06N 3/08* | (2006.01) |
| *G06T 7/00* | (2017.01) |

(52) U.S. Cl.
CPC ......... *G06N 3/0454* (2013.01); *G06K 9/6217* (2013.01); *G06K 9/6267* (2013.01); *G06N 3/08* (2013.01); *G06T 7/0012* (2013.01); *G06T 2207/20081* (2013.01); *G06T 2207/20084* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,825,936 | A | * | 10/1998 | Clarke .................. | G06T 7/0012 382/261 |
| 5,949,367 | A | * | 9/1999 | Trompf ................ | G06K 9/6267 342/90 |
| 7,305,111 | B2 | * | 12/2007 | Arimura ............... | G06T 7/0012 382/131 |
| 7,747,070 | B2 | * | 6/2010 | Puri ..................... | G06K 9/4628 382/157 |
| 7,937,346 | B2 | * | 5/2011 | Kato ........................ | G06N 3/08 706/27 |
| 10,354,362 | B2 | | 7/2019 | Savvides et al. | |

(Continued)

FOREIGN PATENT DOCUMENTS

| | | |
|---|---|---|
| CN | 106096670 A | 11/2016 |
| CN | 106485324 A | 3/2017 |

(Continued)

OTHER PUBLICATIONS

Kayalibay et al., "CNN-based Segmentation of Medical Imaging Data", Computer Vision and Pattern Recognition, arXiv:1701.03056v1, Jan. 2017, 24 pages.

(Continued)

*Primary Examiner* — Tsung Yin Tsai
(74) *Attorney, Agent, or Firm* — Stosch Sabo

(57) ABSTRACT

A cascading convolutional neural network (CCNN) comprising a plurality of convolutional neural networks (CNNs) that are trained by weighting training data based on loss values of each training datum between CNNs of the CCN. The CCNN can receiving an input image from plurality of images, classify the input image using the CCNN, and present a classification of the input image.

20 Claims, 5 Drawing Sheets

(56) References Cited

U.S. PATENT DOCUMENTS

| | | | |
|---|---|---|---|
| 2005/0025355 A1* | 2/2005 | Simard | G06K 9/6256 |
| | | | 382/159 |
| 2005/0125369 A1* | 6/2005 | Buck | G06K 9/00986 |
| | | | 706/12 |
| 2013/0177230 A1* | 7/2013 | Feng | G06T 7/0012 |
| | | | 382/132 |
| 2013/0343642 A1* | 12/2013 | Kuo | G06K 9/6256 |
| | | | 382/159 |
| 2014/0185925 A1* | 7/2014 | Datta | G06K 9/6256 |
| | | | 382/159 |
| 2016/0117587 A1 | 4/2016 | Yan et al. | |
| 2017/0046613 A1* | 2/2017 | Paluri | G06N 3/0454 |
| 2018/0157899 A1* | 6/2018 | Xu | G06K 9/00899 |
| 2018/0189613 A1* | 7/2018 | Wolf | G06T 7/70 |
| 2019/0095795 A1 | 3/2019 | Ren et al. | |

FOREIGN PATENT DOCUMENTS

| | | | |
|---|---|---|---|
| CN | 107766860 A | * | 3/2018 |
| WO | 2016155564 A1 | | 10/2016 |

OTHER PUBLICATIONS

"LUng Nodule Analysis", LUNA 16, Consortium for Open Medical Image Computing Copyright 2012-2017, printed Nov. 1, 2017, 1 page.

Sakamoto et al., "Cascaded Neural Networks With Selective Classifiers and Its Evaluation Using Lung X-Ray CT Images", IBM Tokyo Laboratory, Tokyo, Japan, Computer Vision and Pattern Recognition, Nov. 2016, 4 pages.

Schlemper et al., "A Deep Cascade of Convolutional Neural Networks for MR Image Reconstruction", Computer Vision and Pattern Recognition, arXiv:1703.00555v1, Mar. 2017, 12 pages.

Setio et al., "Validation, comparison, and combination of algorithms for automatic detection of pulmonary nodules in computed tomography images: the LUNA16 challenge", Computer Vision and Pattern Recognition, arXiv:1612.08012v2, Jan. 2017, 16 pages.

Viola et al., "Rapid Object Detection using a Boosted Cascade of Simple Features", Accepted Conference on Computer Vision and Pattern Recognition 2001, Dec. 2001, DOI: 10.1109/CVPR.2001.990517, 9 pages.

\* cited by examiner

WEIGHTED CASCADING CONVOLUTIONAL NEURAL NETWORKS

BACKGROUND

The present disclosure relates to artificial learning, and more specifically, to convolutional neural networks.

Convolutional neural networks are a class of deep feed-forward artificial neural networks that have successfully been applied to analyzing visual imagery. Convolutional neural networks are made up of artificial or neuron-like structures that have learnable weights and biases. Each neuron receives some inputs and performs a dot product.

SUMMARY

Aspects of the present disclosure are directed to a method for classifying an image. The image is trained in cascading convolutional neural network (CCNN) comprising a plurality of convolutional neural networks (CCNs). Training comprises receiving a plurality of images, where a first portion of the plurality of images is associated with a first classification and a second portion of the plurality of images is associated with a second classification, and where the first portion is greater than the second portion by a first factor. The method can train a first CNN of the CCNN using the plurality of images. The method can further weight data of the plurality of images based on a loss function associated with respective data of the plurality of images. The method can further train at least one subsequent CNN of the CCNN based on the weighted data. The method can receive an input image and classifying the input image using the CCNN. The method can present a classification of the input image to a user interface.

Aspects of the present disclosure are further directed to a system comprising a computer readable storage medium storing a corpus of data, and a processor communicatively couple to the computer readable storage medium and the user interface and a memory comprising instructions. The processer can be configured to train an image in a cascading convolutional neural network (CCNN) comprising a plurality of convolutional neural networks (CCNs). Training comprises receiving a plurality of images, where a first portion of the plurality of images is associated with a first classification and a second portion of the plurality of images is associated with a second classification, and where the first portion is greater than the second portion by a first factor. The processor can be configured to train a first CNN of the CCNN using the plurality of images. The processer can be further configured to weight data of the plurality of images based on a loss function associated with respective data of the plurality of images. The processer can be further configured to train at least one subsequent CNN of the CCNN based on the weighted data. The processer can be configured to receive an input image and classifying the input image using the CCNN. The processer can be further configured to present a classification of the input image to a user interface.

Aspects of the present disclosure are further directed to a computer program product comprising a computer readable storage medium having program instructions executable by a processor. The program instructions can train an image in a cascading convolutional neural network (CCNN) comprising a plurality of convolutional neural networks (CCNs). Training comprises receiving a plurality of images, where a first portion of the plurality of images is associated with a first classification and a second portion of the plurality of images is associated with a second classification, and where the first portion is greater than the second portion by a first factor. The program instructions can train a first CNN of the CCNN using the plurality of images. The program instructions can further weight data of the plurality of images based on a loss function associated with respective data of the plurality of images. The program instructions can further train at least one subsequent CNN of the CCNN based on the weighted data. The program instructions can receive an input image and classifying the input image using the CCNN. The program instructions can present a classification of the input image to a user interface.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

Figure 1:
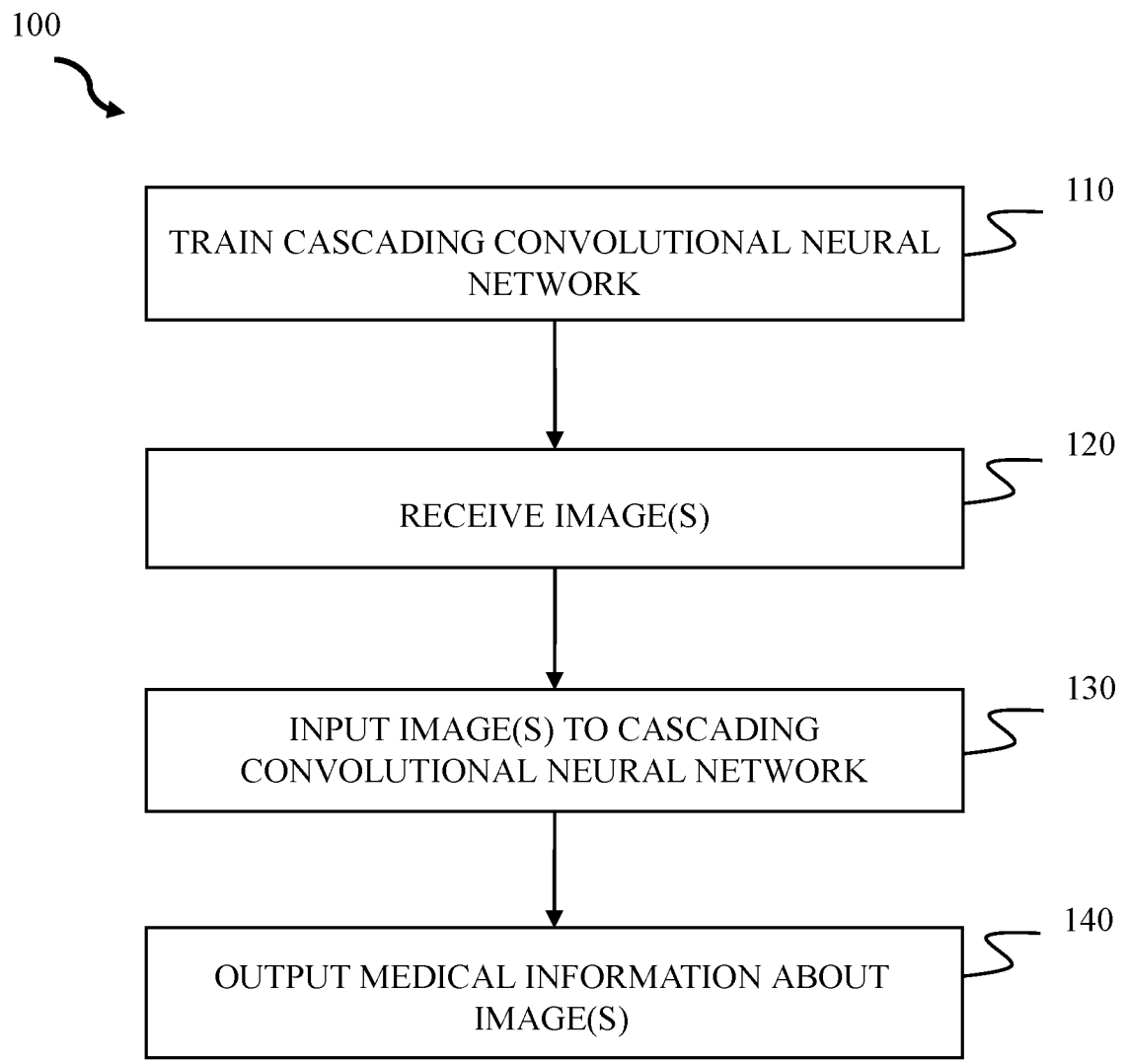
FIG. 1 illustrates a flowchart of an example method for using cascading convolutional neural networks in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

Aspects of the present disclosure relate to artificial learning, and more specifically, to convolutional neural networks (CNNs). Convolutional neural networks are a class of deep feed-forward artificial neural networks that have successfully been applied to analyzing visual imagery. More particular aspects of the present disclosure relate to nodule detection from computed tomography (CT) images. Although not limited to such applications, an understanding of some embodiments of the present disclosure may be improved given the context of cascading convolutional neural networks (CCNNs).

Aspects of the present disclosure relate to improving the accuracy of cascading convolutional neural networks for nodule (e.g., cancerous tumor) detection in computed tomography images of a medical patient (e.g., human). A cascading convolutional neural network comprises two or more stages, where each stage has one convolutional neural network. Each stage of the cascading convolutional neural network trains its respective convolutional neural network, filters (e.g., removes) obvious non-nodule images, and forwards the resulting dataset (e.g., nodules, non-obvious non-nodules) to the next convolutional neural network. A convolutional neural network architecture comprises a stack of layers operating to receive an input (e.g., a single vector) and transform it through a series of hidden layers. Each hidden layer is made up of a set of neurons, where each neuron has learnable weights and biases, where each neuron can be fully connected to all neurons in the previous layer, and where neurons in a single layer can function independently without any shared connections. The last layer is the fully connected output layer and in classification settings it represents the class scores, which can be arbitrary real-valued numbers, or real-valued targets (e.g. in regression). Aspects of the present disclosure relate to weights of convolutional neural networks, and more specifically, training a convolutional neural network in a cascading convolutional neural network by weighting a loss value of each training datum.

Current convolutional neural network nodule detection methods can misidentify non-nodules (e.g., an abnormally large aggregation of cells) as nodules (e.g., false positives). An imbalance of accessible training data inhibits attempts to reduce erroneous detection because of the relatively large number of non-nodule images and the relatively smaller number of nodule images. Training a model using an imbalanced dataset can result in false positives. However, cascading convolutional neural networks can perform superior to conventional convolutional neural networks by using a selective classifier (e.g., classification with a reject option). For example, cascading convolutional neural networks can remove obvious non-nodules at each respective convolutional neural network. Advantageously, convolutional neural networks at later stages of cascading convolutional neural networks are trained on a more balanced dataset which can result in fewer false positives while maintaining high sensitivity.

In embodiments, cascading convolutional neural networks may work with selective classifiers to reduce the false positives of lung nodule detection in CT scan images. Advantageously, it is shown the proposed method achieves more sensitive results from the lung nodule detection task in comparison with a conventional convolutional neural network approach (e.g., FIG. 5). By using the cascading convolutional neural networks, obvious non-nodules are rejected at each cascading stage. The system thus can present image candidates with nodule probabilities to a radiologist, thereby decreasing the burden of image interpretation on medical professionals.

As may be understood by one skilled in the art, in conventional neural networks, the first stage of a convolutional neural network is executed in the convolutional layer. Input can then be passed from the convolutional layer to a non-linear layer (e.g., Rectified Linear Units (ReLU) Layer). In conventional neural networks, a pooling layer can be applied after a convolutional or ReLU layer. In conventional neural networks, between layers of convolutional neural networks, comprise training stages. Lastly, an output is executed through a fully connected layer.

Referring now to the figures, FIG. 1 depicts a flowchart of an example method 100 for using cascading convolutional neural networks in accordance with some embodiments of the present disclosure. In various embodiments, the method 100 can be implemented by one or more processors. In embodiments, the method 100 starts with operation 110. Operation 110 trains a cascading convolutional neural network comprising a plurality of respective convolutional neural networks to establish parameters for future training operations. In embodiments, for example, the convolutional neural network can comprise twelve layers. Each convolutional neural network performs as a selective classifier to filter the plurality of images. In embodiments, for example, the plurality of images can comprise input images (e.g., computed tomography (CT) scans) received from, for example, a graphical user interface, a database, a network, or a different source. Operation 110 is described in more detail hereinafter with respect to FIGS. 2-3.

Operation 120 receives one or more images for classification by the cascading convolutional neural network trained in operation 110. In various embodiments, the plurality of images can comprise an internal body structure (e.g., lung) comprising identification features (e.g., shape, size, density, texture) associated with a first classification (e.g., non-nodules). In various embodiments, the plurality of images can comprise an internal body structure (e.g., lung) comprising identification features (e.g., shape, size, density, texture) associated with a second classification (e.g., nodules). Although not limited to such applications, in embodiments, non-nodules (e.g., an absence of any nodules, or a non-cancerous nodule-like structure comprising an aggregation of cells or a mass of soft tissue) and nodules (e.g., cancerous tumors) comprise the main classification identifiers for the one or more images received in operation 120. In embodiments, the plurality of images is created by a computed tomography machine operated by a user (e.g., doctor, nurse practitioner, medical professional).

In embodiments, an individual image of the plurality of images, received in operation 120, is input into a cascading convolutional neural network in operation 130. A cascading convolutional neural network can comprise a plurality of conventional convolutional neural networks. In embodiments, the input image of operation 130 is processed through a twelve-layer convolutional neural network. In embodiments, a twelve-layer convolutional neural network comprises an input layer, four numerically identifiable convolutional layers alternating with four numerically identifiable pooling layers, two consecutive identifiable fully-connected layers, and an output layer.

In embodiments, the cascading convolutional neural network of operation 130 uses the established parameters (e.g., hyper parameters) to search for identification features (e.g., shape, size, density, texture) associated with either the first or second classification of the plurality of images. Operation 140 receives the classification (e.g., non-nodule, nodule, error) about the input image and outputs the classification to a user profile.

It is noted that FIG. 1 is intended to depict the representative major operations of an example method 100 for using a cascading convolutional neural network. In some embodiments, however, individual operations can have greater or lesser complexity than as represented in FIG. 1, operations other than or in addition to those shown in FIG. 1 can be present, and the number, type, and configuration of such operations can vary.

Figure 2:
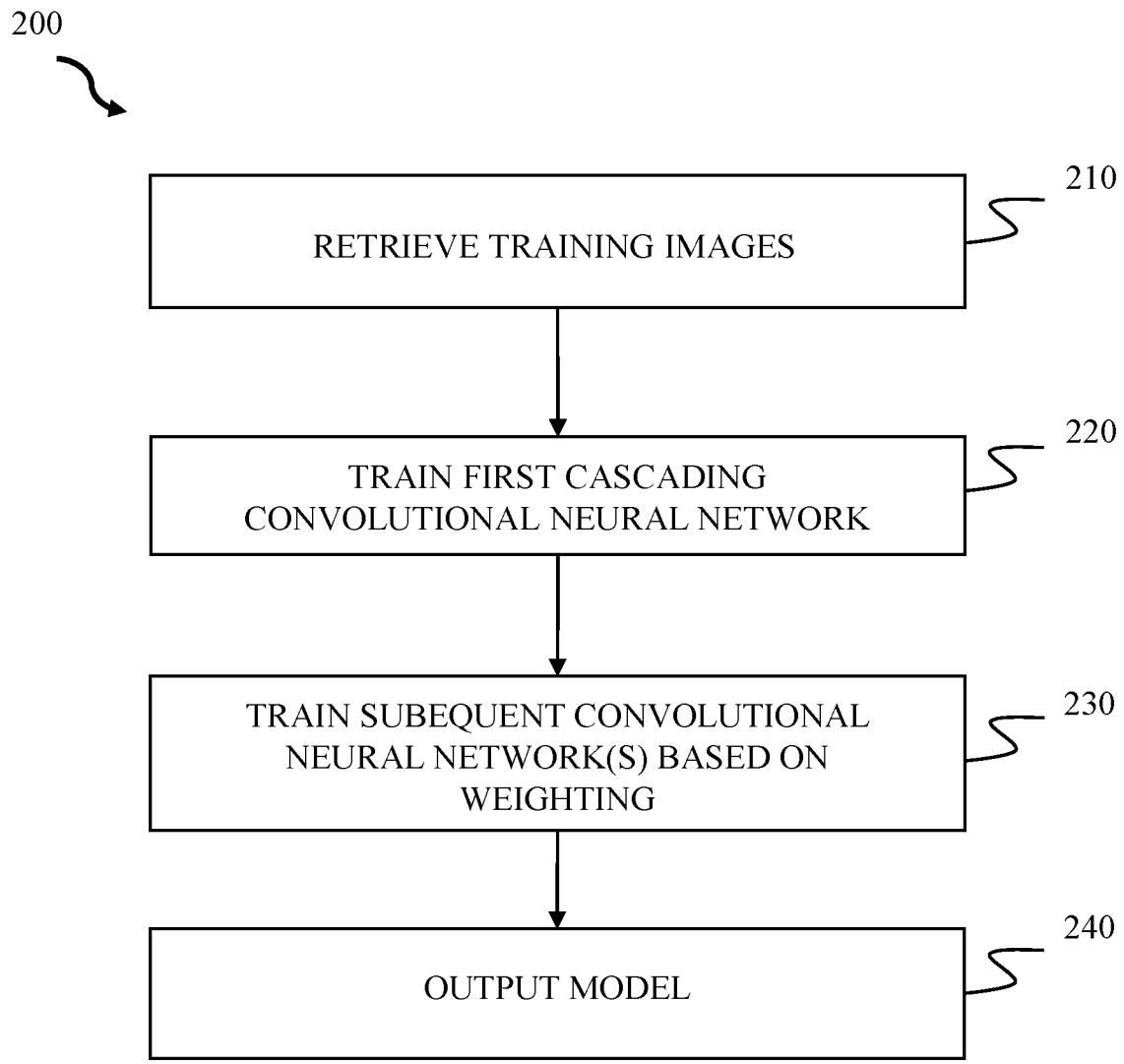
FIG. 2 illustrates a flowchart of an example method for training a cascading convolutional neural network in accordance with some embodiments of the present disclosure.

Referring to FIG. 2, illustrated is a flowchart of an example method 200 for training a cascading convolutional neural network in accordance with some embodiments of the present disclosure. In embodiments, example method 200 is a sub-method of operation 110 of FIG. 1. In various embodiments, the example method 200 can be implemented by one or more processors. In embodiments, the example method 200 starts with operation 210. Operation 210 can retrieve training images (e.g., CT scans, MRI's, X-rays) from, for example, a graphical user interface, a database, a network, or a different source. In various embodiments, the training images can comprise internal body structures (e.g., lung) comprising identification features (e.g., shape, size, density, texture) of nodules (e.g., cancerous tumors) and non-nodules (e.g., aggregation of cells, mass of soft tissue). In embodiments, the training images may be created by a computed tomography machine operated by a user (e.g., doctor, nurse practitioner, medical professional). In embodiments, operation 210 can be applied to each input image of the plurality of images, comprising a training set of non-nodule and nodule identification images. In embodiments, the portion associated with the first classification (e.g., non-nodules) is greater than the portion associated with the second classification (e.g., nodules). In some embodiments, the portion associated with the first classification is larger than the portion associated with the second classification by a first factor (e.g., the portion associated with the first classification divided by the portion associated with the second classification). The output of operation 210 can comprise a training set of identified non-nodules and identified nodules for additional respective convolutional neural networks.

In embodiments, training images can be digital images changed into a sequence of numbers comprising an array of picture element (pixel) values depending on image resolution and size. In embodiments, for example, the training images may have a width 32×height 32×color channel 3 (e.g., RGB) array of pixel values. Every pixel element is given a value from 0 to 255 to describe the pixel intensity (e.g., color). For example, operation 210 may search the convolutional layer of the training images for areas of dark concentrated pixel values. In embodiments, these concentrated areas could correlate to contrasting edges and borders between a nodule and the anatomical organ in which it resides (e.g., lung).

In embodiments, operation 220 begins by training the first convolutional neural network of the cascaded convolutional neural network. Operation 220 receives one or more isolated training image and can convolute the receptive field of the first convolutional layer using a filter of neurons and their respective array of weights. In embodiments, the receptive field is the top layer of the input image (i.e., the layer a user sees). In embodiments, the depth of the filter is equivalent to the depth of the input, for example, a width 5×width 5×color channel 3 (e.g., RGB) parameter array of weights. In operation 210, the convolutional filter can slide (e.g., 1 pixel at a time) or stride (e.g., >1 pixel at a time) in equivalent segments around the entire convolutional layer of the input image, calculating the dot product of the filter with the original pixel values of the image.

In embodiments, a third dimension (e.g., number of filters) of an array and input image is necessary for matrix multiplication when the dot product between the input image and filter is calculated. The resulting values can be summed and output as a single number. Because convoluting the receptive field uses segmentation, every location of the receptive field can be processed to produce an output number. In embodiments, the output numbers are concentrated in two dimensions, creating an activation map. In embodiments, after each consecutive convolution, the array of pixel dimensions decrease in size and each input is the activation map of the preceding layer.

The convolutional layer's parameters may comprise a learnable filter (e.g., neuron, kernel) comprising an array of numbers (e.g., weights). In artificial learning, neurons comprise the basic computational units of neural networks. In embodiments, during the forward pass (e.g., passing an image through the network), each filter can be convolved across the volume of the receptive field of an input image. A dot product can then be computed between the entries of the filter and the input image producing a two-dimensional activation map of that filter. As a result, the network learns filters that activate when it detects some specific type of feature at some spatial position in the input. The activation map of the input nodule image is passed to the next layer.

Operation 220 can further comprise a non-linearity layer. In conventional convolutional neural networks, a non-linearity layer (e.g., Rectified Linear Units (ReLU) Layer) can immediately follow a convolutional layer. Non-linearity layers apply an elementwise activation function, either non-saturating (e.g., activation function) or a saturating function (e.g., hyperbolic tangent function, sigmoid function) to increase the nonlinear properties of the decision function. In doing so, non-linearity layers create identical inputs and outputs. An activation function can be used (e.g., $f(x)=\max(0, x)$). In embodiments, for example, the non-linearity layer using the activation function on the activation map of the input nodule image can effectively change the negative activation maps in the receptive field of the negative values to 0. This increases the nonlinear properties of the overall network without affecting the receptive field of the convolutional layer. In embodiments, the non-linearity layer is located within the convolutional layer and does not function independently as its own layer.

Operation 220 can comprise a pooling layer. In conventional convolutional neural networks, a pooling layer can be applied after a convolutional layer or ReLU layer. In embodiments, a first pooling layer may be applied after the first convolutional layer. A pooling layer is a non-linear down sampling layer functioning along the spatial dimensions (e.g., width, height). The pooling layer progressively reduces the spatial size of the activation map to reduce the number of parameters and amount of computation in a network. The first pooling layer operates by defining a window of size (e.g., scale factor of input image) and reducing the data in the window to a single value. A procedure to reduce the data in the window to a single value is max pooling. Max pooling can partition the input image into a set of non-overlapping rectangles and, for each sub-region, output a maximum number. This number can be calculated from the number values assigned to the array of pixels in the input image, thus, controlling overfitting (e.g., too many parameters). Overfitting refers to when a convolutional neural network is not able generalize the data. Pooling layers operate independently between successive convolutional layers in convolutional neural network architecture. In embodiments, for example, the max-pooling layer could comprise a max pool with a width 16×height 16×color channel 3 array of pixels. Further the max pool could comprise a stride of 16 pixels. Reducing the spatial dimension of the input, max pooling the activation layer of the input image of the nodule would create a width 2×height 2 matrix. For example, if the input image of the nodule was partitioned in four equivalent non-overlapping sections and subsampling (e.g., weighted sum of the local region) occurred on the activation map of each partitioned section, the output activation map would be reduced to a new smaller size.

In embodiments, three additional convolutional layers (e.g., second, third, fourth) and three additional pooling layers (e.g., second, third, fourth) may exist in the first convolutional neural network. In embodiments, after the first convolutional layer convolutes the receptive field and the pooling layer max pools the activation map, three additional sequences of a convolutional layer and a pooling layer follow, respectively. In embodiments, each additional sequence of layers may perform the same functions as the first set of convolutional and pooling layers. In embodiments, the output of a preceding layer may become the input of subsequent layer. For example, the third convolutional layer of the respective twelve-layer convolutional neural network may convolute the regressed activation map of the second pooling layer.

Operation 220 can further comprise a fully connected layer before the output layer. In embodiments, the respective convolutional neural network may have two fully connected layers. Fully connected layers are multilayer perceptrons aimed to map the activation map's volume from the combination of previous different layers (e.g., convolutional, pooling) into a class probability distribution. The output of a fully connected layer will have output neurons. Fully connected layers may tune weight parameters of the output neurons to create stochastic likelihood representations of each class score, based on the activation maps generated by the concatenation of convolutional, non-linearity, and pooling layers. In embodiments, for example, if the fully connected layer of the nodule input image has an abnormal score, then there is a high likelihood that the nodule input image is classified a non-obvious nodule. In embodiments, the two fully connected layers of the twelve-layer convolutional neural network may precede an output layer.

In embodiments, the output of the first convolutional neural network may produce a loss value representing the value of the numerical value regression of the activation map established from continuous pooling layers.

In embodiments, convolutional neural networks are concatenated in a cascade arrangement. A cascaded convolutional neural network can comprise n-layers of convolutional neural networks. After the first convolutional neural network of operation 220 has been trained, operation 230 may be executed.

Operation 230 starts by weighting the respective data of the plurality of images obtained from operation 220 based on the loss function associated with respective data of the plurality of images. In embodiments, the loss function produces the loss value associated with operation 220. In embodiments, data associating the classification of the plurality of images is weighted.

In embodiments, operation 230 can train at least one subsequent convolutional neural network of the respective cascading convolutional neural network based on the weight parameters of the previously executed convolutional neural network. In embodiments, using the plurality of images, the subsequent convolutional neural network convolutes the receptive fields and follows the operations of the first twelve-layer convolutional neural network in operation 220. The convolutional neural network of the cascading convolutional neural network then trains itself based on weighted data and the loss value of operation 220.

In embodiments, the convolutional neural network multiplies the loss value of a j-th datum, d, within the plurality of images, to the weight of a previous j-th training datum. In embodiments, the subsequent convolutional neural network of the cascading convolutional neural network is trained based on weighted data. In embodiments, weighted data comprises a subset of the portion of images associated with the first classification (e.g., non-nodule images) and/or a subset of the portion associated with the second classification (e.g., nodule images). The subset of the portion associated with the first classification can be greater than the subset of the portion associated with the second classification by a second factor. In some embodiments, the second factor is less than the first factor (previously discussed with respect to operation 210 of FIG. 2). Thus, in some embodiments, the weighted data comprises a more balanced dataset compared to the original dataset.

In embodiments, training focuses on the loss value at each j-th datum. The convolutional neural networks of operation 230 can be trained on individual stages, i, of a training dataset (e.g., the training dataset established in operation 220) with the loss value of each j-th datum multiplied with the weight for the j-th datum at the individual stage i.

In embodiments, during training of the convolutional neural network, the cascading convolutional neural network removes at least a portion from the plurality of images to create a second (e.g., modified) plurality of images. In embodiments, the convolutional neural network discussed in operation 230 or a subsequent convolutional neural network thereafter can be based on the second plurality of images, where the second plurality of images comprises the subset of the portion associated with the first classification and the subset of the portion associated with the second classification. In embodiments, the plurality of images comprises computed tomography (CT) images, where the portion of the plurality of images associated with the first classification comprise respective CT images indicating no nodules, where the portion of the plurality of images associated with the second classification comprise respective CT images indicating at least one nodule.

In embodiments, the sequence of convolutional neural networks receives an input image from the plurality of images and using at least one subsequent twelve-layer convolutional neural network, classifies the input image using the cascading convolutional neural network and weighted data in operation 230. Classifying the input image can include, but is not limited to, non-nodule and nodule analysis. Operation 230 is described in more detail hereinafter with respect to FIG. 3.

Operation 240 outputs a cascading convolutional neural network model. Outputting can include, but is not limited to, storing, presenting, using, and/or transmitting the cascading convolutional neural network. In embodiments, classification is dependent upon the weighted value of neurons. In doing so, weights are calculated by using the results at earlier stages so that training at next stages focus on where loss values are great. This ensures a model will give more weight towards convolutional neural networks with input images where input images are not identifiable.

It is noted that FIG. 2 is intended to depict the representative major components of an example method 200. In some embodiments, however, individual components can have greater or lesser complexity than as represented in FIG. 2, operations other than or in addition to those shown in FIG. 2 can be present, and the number, type, and configuration of such components can vary.

Figure 3:
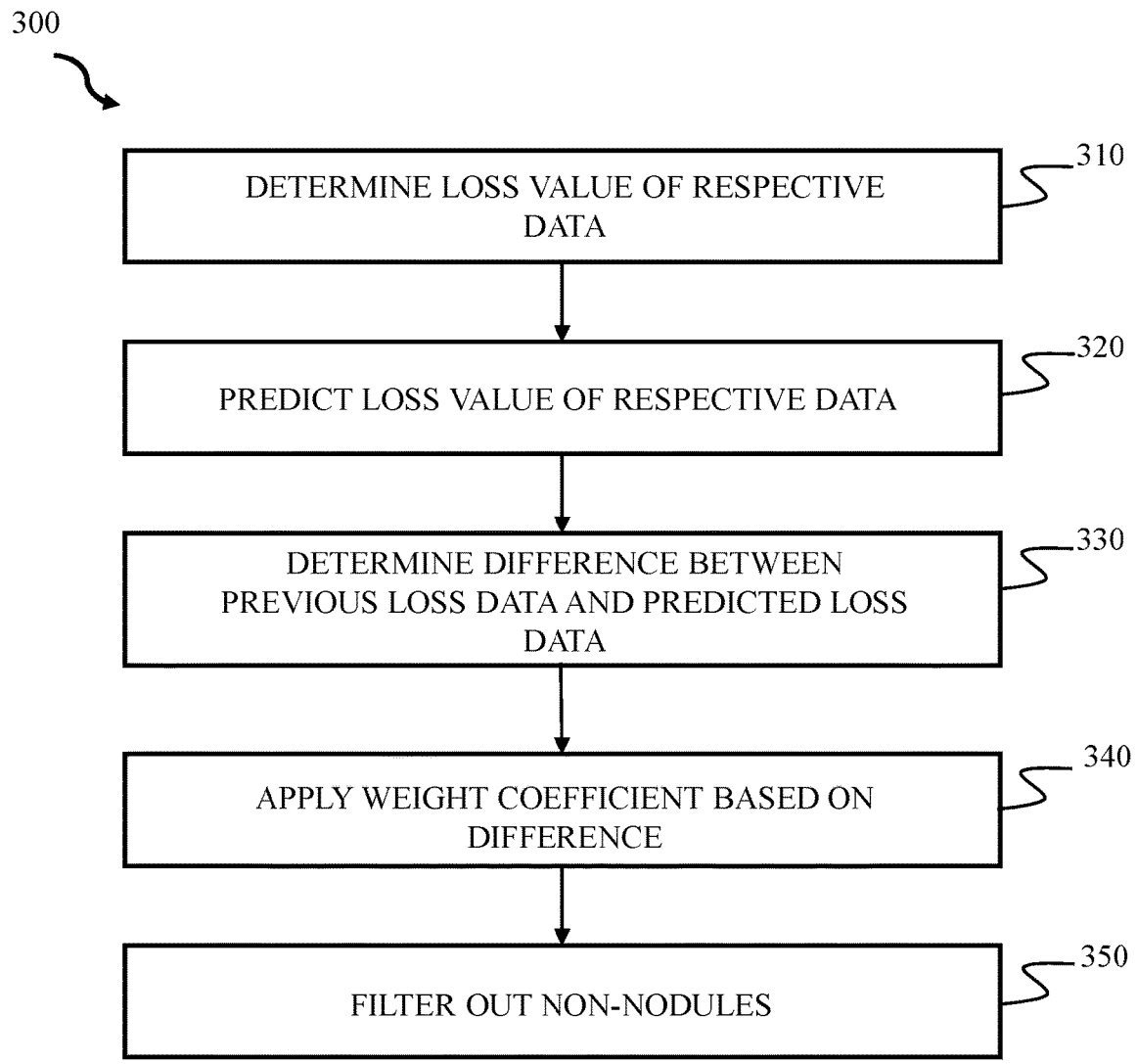
FIG. 3 illustrates a flowchart of an example method for training subsequent convolutional neural networks based on weighting data in accordance with some embodiments of the present disclosure.

Referring to FIG. 3, FIG. 3 illustrates a flowchart of an example method 300 for training subsequent convolutional neural networks based on weighting data in accordance with some embodiments of the present disclosure. In embodiments, FIG. 3 is a sub-method of operation 230 of FIG. 2. In various embodiments, the method 300 can be implemented by one or more processors. In embodiments, the method 300 starts with operation 310.

In embodiments, operation 310 determines the loss value of respective data of an input image at a preceding convolutional neural network. In embodiments, the convolutional neural network previously discussed in operation 230 of FIG. 2 comprises the convolutional neural network in the method 300. For the purposes of FIG. 3, convolutional neural networks are regarded as subsequent convolutional neural networks to the convolutional neural network of operation 220 of FIG. 2 unless otherwise identified. In embodiments, operation 310 can identify the convolutional neural network's training stage, i, training weight, W[i], and training dataset, T[i], in order to determine a loss value of respective data. In embodiments, the respective data is based on an output for a respective datum from at least one previous convolutional neural network.

In embodiments, the loss value represents the value of the numerical value regression of the activation map derived in the fully connected layer established from the input of the pooling layer. In embodiments, a loss layer exists prior to a subsequent convolutional neural network which adjusts weights across the preceding network. Before training a convolutional neural network, the weights in the convolution and fully connected layers are given random values.

In operation 310, the training associated with the first convolutional neural network can be regarded as i:=0, and all training data is equally weighted (T[0]:=whole training set) with individual weights initialized to the same value (W[0]:=[1, . . . , 1]). In subsequent convolutional neural network training stages, weights are directly adjusted based on the loss function associated with the data of the plurality of images. Using the weights adjusted by the loss function, operation 320 can predict an output for the input image's respective datum in the fully connected layer. An output can comprise a new array of weights associated with the input image after regression occurs in the activation map.

Operation 330 can check the fully connected layer's predicted loss value of the respective data against the determined loss value of the respective data. The loss value is determined by adjusting the weights in both the convolution and fully connected layers. In subsequent convolutional neural networks, operation 330 reclassifies the training stage i, as i=i+1. In embodiments, for future iterations, the new value of i is used and updated after every additional execution of operation 330. In embodiments, for each j-th training datum d, the weight for the j-th training datum at stage i is recalculated. A new W[i][j] is calculated using the i-th convolutional neural network, d, and the expected value of d.

A weighting function, w(o,e), can weight the function of the original loss value and the expected loss value. In embodiments, the weighting function can be, w(o,e):=l+n*exp(abs(o−e), m), where l, m, n are parameters such that l, n,>0. In embodiments, operation 330 calculates the weights used in the next training stage. In embodiments, operation 330, establishes new parameters for training stage i, and the calculation of W[i][j] can be further parameterized by: 1+abs([expected value of d]−[output of convolutional neural network for d]). In doing so, the weighting function can return floating-point values of the loss value larger than 0, thereby enabling focus to be on negative loss values.

Operation 340 can apply a weight coefficient based on the difference determined in operation 330. In embodiments, training at a next convolutional neural network focuses on data when loss values of an earlier stage (e.g., first convolutional neural network or a previous convolutional neural network) are great. A correlation exists between the presence of larger weights for training data and convolutional neural networks that do not show good performance (e.g., correct classification identifier). For example, larger weight is given for a training datum in which convolutional neural networks do not show good performance to emphasize the relevancy of information contained in the training data.

In operation 350, a new training stage, T[i], is established as a result of filtering out obvious non-nodules at stage i. In embodiments, operation 350 repeats the training of convolutional neural network with refined calculated weights and filters out training data until proper nodular analysis has been identified. As a result, training each convolutional neural network with weighted loss values, improves the accuracy of cascading convolutional neural networks.

It is noted that FIG. 3 is intended to depict the representative major components of an example method 300. In some embodiments, however, individual components can have greater or lesser complexity than as represented in FIG. 3, components other than or in addition to those shown in FIG. 3 can be present, and the number, type, and configuration of such components can vary.

Figure 4:
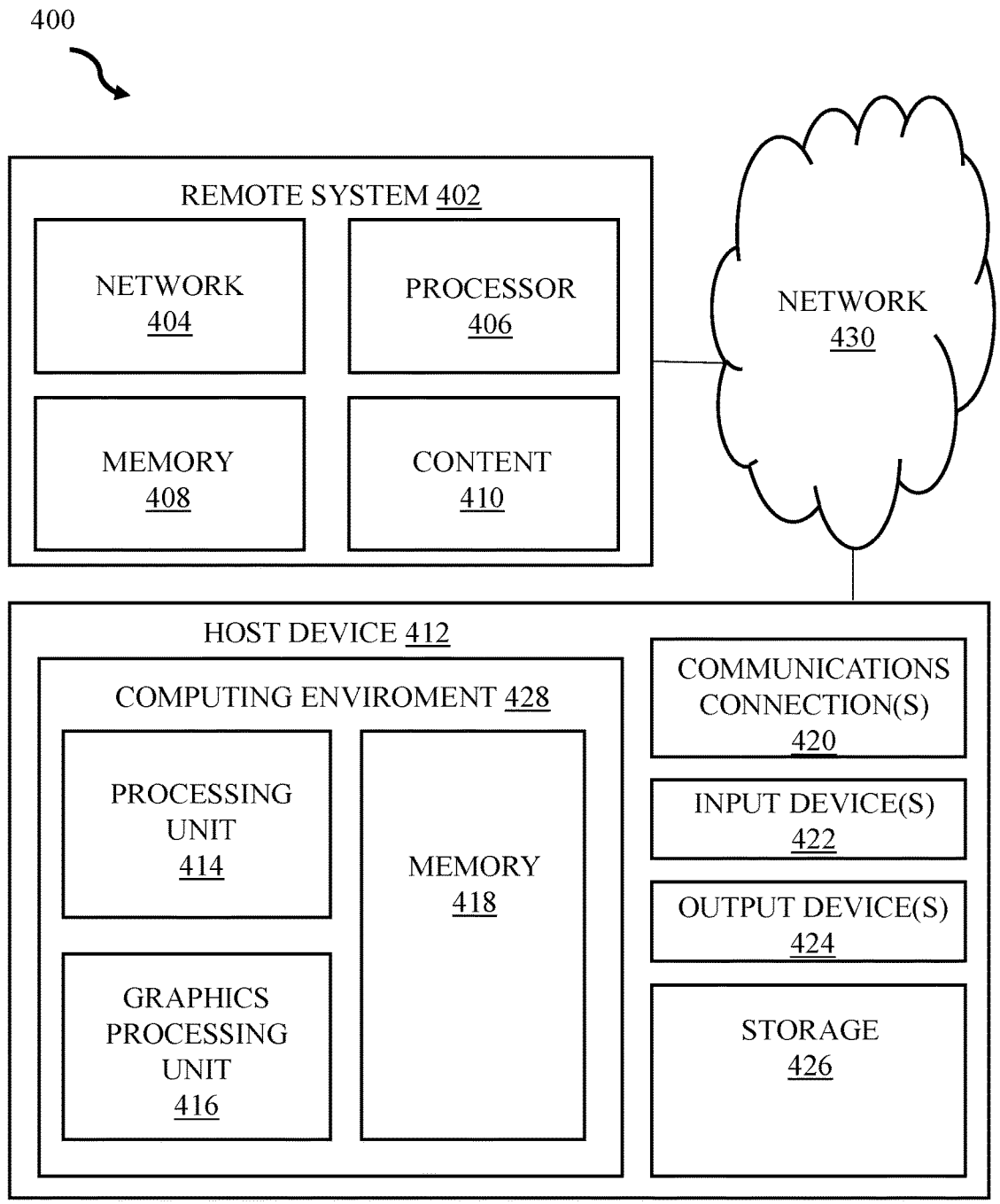
FIG. 4 depicts a block diagram of an example computing environment in which embodiments of the present disclosure may be implemented.

FIG. 4 depicts a block diagram of an example computing environment 400 in which embodiments of the present disclosure can be implemented. In some embodiments, aspects of computing environment 400 can perform any of the methods described in FIGS. 1, 2, and/or 3. In embodiments, the computing environment 400 can include a remote system 402 and a host device 412.

According to embodiments, the host device 412 and the remote system 402 can be computer systems. The remote system 402 and the host device 412 can include one or more processors 406 and 414 and one or more memories 408 and 418, respectively. The remote system 402 and the host device 412 can be configured to communicate with each other through an internal or external network interface 404 and communications connection(s) 420 (e.g., modems or interface cards). The remote system 402 and/or the host device 412 can be equipped with a display or monitor. Additionally, the remote device 402 and/or the host device 412 can include optional input devices (e.g., a keyboard, mouse, scanner, or other input device), and/or any commercially available or custom software (e.g., browser software, communications software, server software, natural language processing software, search engine, and/or web crawling software, filter modules for filtering content based upon predefined parameters, etc.). In some embodiments, the remote system 402 and/or the host device 412 can be servers, desktops, laptops, or hand-held devices.

The remote system 402 and the host device 412 can be distant from each other and can communicate over a network 430. In embodiments, the host device 412 can be a central hub from which a remote system 402 and other remote devices (not pictured) can establish a communication connection, such as in a client-server networking model. In some embodiments, the host device 412 and remote system 402 can be configured in any other suitable network relationship (e.g., in a peer-to-peer configuration or using another network topology).

In embodiments, the network 430 can be implemented using any number of any suitable communications media. For example, the network 430 can be a wide area network (WAN), a local area network (LAN), the Internet, or an intranet. In certain embodiments, the remote system 402 and the host device 412 can be local to each other, and communicate via any appropriate local communication medium. For example, the remote system 402 and the host device 412 can communicate using a local area network (LAN), one or more hardwire connections, a wireless link or router, or an intranet. In some embodiments, the remote system, the host device 412, and any other devices can be communicatively coupled using a combination of one or more networks and/or one or more local connections. For example, the remote system 402 can be hardwired to the host device 412 (e.g., connected with an Ethernet cable) while a second device (not pictured) can communicate with the host device using the network 430 (e.g., over the Internet).

In some embodiments, the network 430 can be implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 430.

In some embodiments, the remote system 402 can enable users to review, create, and/or provide input images (e.g., CT scans) to the host device 412. In some embodiments, the host device 412 can include input device(s) 422 (e.g., computed tomography machine) and output device(s) 424 (e.g., printer, a graphical user interface) directly. The host device 412 can contain subcomponents, such as a computing environment 428. The computing environment 428 can include a processing unit 414, a graphics processing unit 416, and a memory 418. The computing environment 428 can be configured to perform processing to ingest content 410 from remote system 402. Content can be, for example, CT scan(s) of nodule(s) and non-nodule(s). In various embodiments, content 410 can further comprise other images, medical information, a set of data (e.g., a user profile), or a corpus of data (e.g., a database of patient profiles, a set of training data, etc.).

The storage 426 can be configured to store training information regarding weighted data as well as can be connected to memory 418.

While FIG. 4 illustrates a computing environment 400 with a single host device 412 and a single remote system 402, suitable computing environments for implementing embodiments of this disclosure can include any number of remote devices and host devices. The various models, modules, systems, instructions, and components illustrated in FIG. 4 can exist, if at all, across a plurality of host devices and remote devices.

It is noted that FIG. 4 is intended to depict the representative major components of an example computing environment 400. In some embodiments, however, individual components can have greater or lesser complexity than as represented in FIG. 4, components other than or in addition to those shown in FIG. 4 can be present, and the number, type, and configuration of such components can vary.

Figure 5:
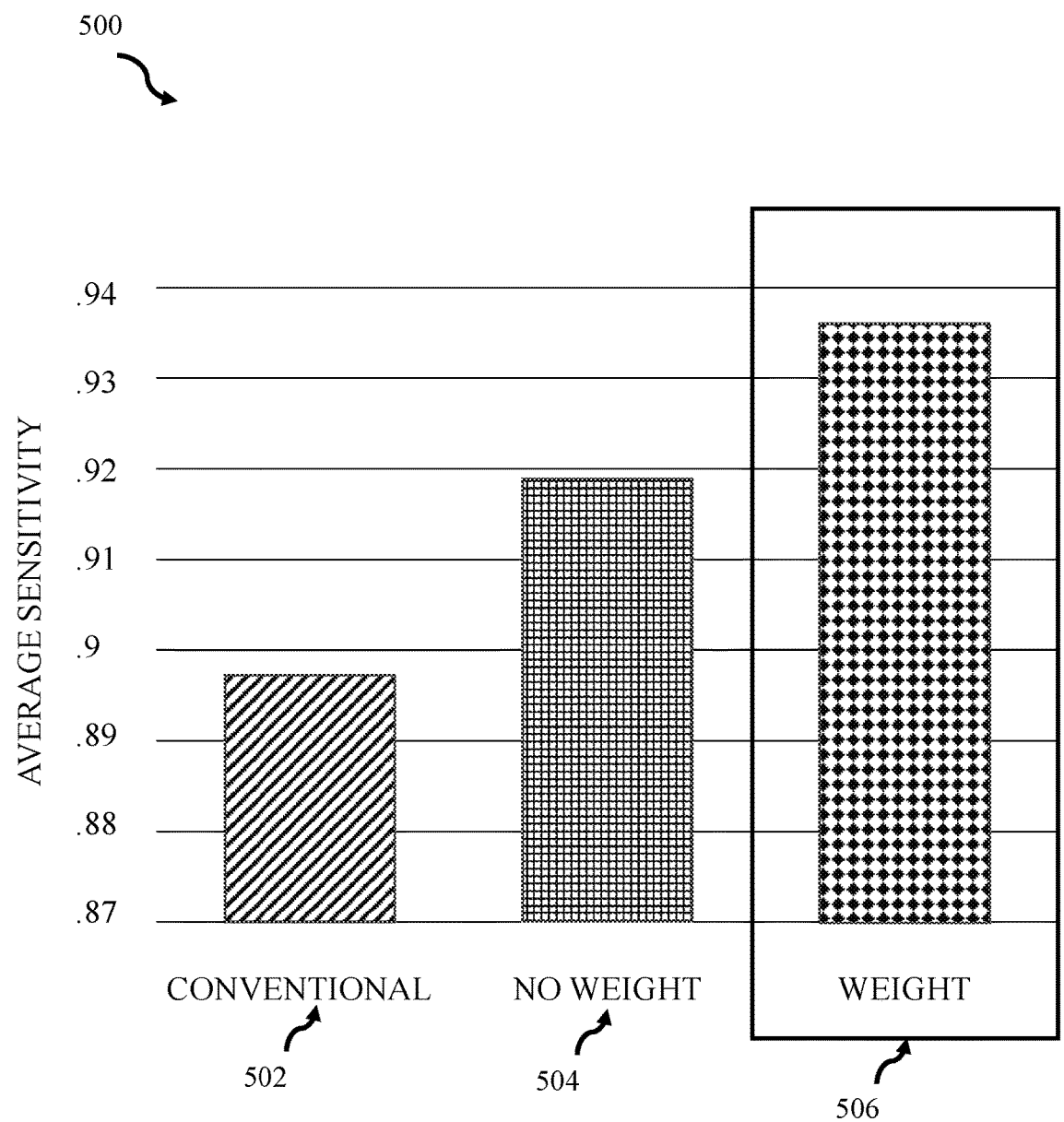
FIG. 5 depicts example experimental results of some embodiments of the present disclosure.

Referring to FIG. 5, FIG. 5 depicts example experimental results 500 of some embodiments of the present disclosure. In embodiments, results reflect the average sensitivity cascaded convolutional neural networks yielded from an average precision of true positives in cases where there can be at least four and at most eight false positives.

In embodiments, experiment 502 used a conventional cascading convolutional neural network method, experiment 504 used a non-weighted cascading convolutional neural network method, and experiment 506 used a weighted cascading convolutional neural network method (in accordance with some embodiments of the present disclosure). As shown in experimental results, a cascading convolutional neural network 504 has higher sensitivity than a single convolutional neural network 502, and a weighted cascading convolutional neural network 506 has a higher sensitivity than a cascading convolutional neural network 504 without weighting.

Advantageously, it is shown that aspects of the present disclosure achieve good results from a nodule detection task compared with conventional convolutional neural networks. By using the cascading convolutional neural networks with weighted values, the chances for accurate nodular detection are greatest.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or subset of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing, or otherwise receiving payment for use of the systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for classifying an image comprising:
   training a cascading convolutional neural network (CCNN) comprising a plurality of convolutional neural networks (CCNs), wherein the training comprises:
   receiving a plurality of images, wherein a first portion of the plurality of images is associated with a first classification and a second portion of the plurality of images is associated with a second classification, wherein the first portion is greater than the second portion by a first factor, wherein the first factor is determined by dividing the first portion by the second portion;

training a first CNN of the CCNN using the plurality of images;

weighting data of the plurality of images based on a loss function associated with respective data of the plurality of images;

training at least one subsequent CNN of the CCNN based on the weighted data;

receiving an input image;

classifying the input image using the CCNN; and presenting a classification of the input image to a user interface.

2. The method of claim 1, wherein at least one subsequent CNN of the CCNN is trained based on a first subset of the first portion of the plurality of images and a second subset of the second portion of the plurality of images, wherein the first subset of the first portion is greater than the second subset of the second portion by a second factor, wherein the second factor is less than the first factor, wherein the second factor is determined by dividing the first subset by the second subset, wherein a sum of the first subset and the second subset do not encompass the entirety of the plurality of images.

3. The method of claim 2, wherein training a CCNN further comprises:

removing images from the plurality of images to create a second plurality of images comprising the first subset of the first portion and the second subset of the second portion, wherein at least one subsequent CNN is based on the second plurality of images.

4. The method of claim 1, wherein training a first CNN using the plurality of images further comprises:

convoluting a receptive field of at least one image;

establishing an activation map;

applying an activation function to the activation map;

max-pooling the activation map;

computing weights for a next training stage; and determining at least one loss value.

5. The method of claim 1, wherein the plurality of images comprises computed tomography (CT) images, wherein the first portion of the plurality of images comprises CT images indicating no nodules, and wherein the second portion of the plurality of images comprises CT images indicating at least one nodule.

6. The method of claim 1, wherein weighting data is based on an output for a datum from at least one previous CNN and a predicted output for the datum from a current CNN.

7. The method according to claim 6, wherein weighting respective data is further based on an absolute value of the difference between the output for the respective data from the at least one previous CNN and a predicted output for the respective datum from a current CNN.

8. A system for classifying an image comprising:

a computer readable storage medium storing a corpus of data; and a processor communicatively coupled to the computer readable storage medium and the user interface and having a memory comprising instructions which, when executed by the processor, cause the processor to:

train a cascading convolutional neural network (CCNN) comprising a plurality of convolutional neural networks (CCNs), wherein the training comprises:

receiving a plurality of images, wherein a first portion on the plurality of images are associated with a first classification, wherein a second portion of the plurality of images are associated with a second classification, wherein the first portion is greater than the second portion by a first factor, wherein the first factor is determined by dividing the first portion by the second portion;

training a first CNN of the CCNN using the plurality of images;

weighting data of the plurality of images based on a loss function associated with respective data of the plurality of images;

training at least one subsequent CNN of the CCNN based on the weighted data;

receive an input image;

classify the input image using the CCNN; and present a classification of the input image to a user interface.

9. The system of claim 8, wherein at least one subsequent CNN of the CCNN is trained based on a first subset of the first portion of the plurality of images and a second subset of the second portion of the plurality of images, wherein the first subset of the first portion is greater than the second subset of the second portion by a second factor, wherein the second factor is determined by dividing the first subset by the second subset, wherein the second factor is less than the first factor, wherein the sum of the first subset and second subset do not encompass the entirety of the plurality of images.

10. The system of claim 9, wherein training a CCNN further comprises:

removing images from the plurality of images to create a second plurality of images comprising the first subset of the first portion and the second subset of the second portion, wherein at least one subsequent CNN is based on the second plurality of images.

11. The system of claim 8, wherein training a first CNN using the plurality of images further comprises:

convoluting a receptive field of at least one image;

establishing an activation map;

applying an activation function to the activation map;

max-pooling the activation map;

computing weights for a next training stage; and determining at least one loss value.

12. The system of claim 8, wherein the plurality of images comprises computed tomography (CT) images, wherein the first portion of the plurality of images comprise CT images indicating no nodules, wherein the second portion of the plurality of images comprise CT images indicating at least one nodule.

13. The system of claim 8, wherein weighting data is based on an output for a datum from at least one previous CNN and a predicted output for the datum from a current CNN.

14. The system according to claim 12, wherein weighting data is further based on an absolute value of the difference between the output for the respective data from the at least one previous CNN and a predicted output for the respective datum from a current CNN.

15. A computer program product for classifying an image comprising a computer readable storage medium having program instructions embodied therewith, the program instructions executable by a processor to cause the processor to:

train a cascading convolutional neural network (CCNN) comprising a plurality of convolutional neural networks (CCNs), wherein the training comprises:

receiving a plurality of images, wherein a first portion on the plurality of images are associated with a first classification, wherein a second portion of the plurality of images are associated with a second classification, wherein the first portion is greater than the second portion by a first factor, wherein the first factor is determined by dividing the first portion by the second portion;

training a first CNN of the CCNN using the plurality of images;

weighting data of the plurality of images based on a loss function associated with respective data of the plurality of images;

training at least one subsequent CNN of the CCNN based on the weighted data;

receive an input image;

classify the input image using the CCNN; and present a classification of the input image to a user interface.

16. The computer program product of claim 15, wherein at least one subsequent CNN of the CCNN is trained based on a first subset of the first portion of the plurality of images and a second subset of the second portion of the plurality of images, wherein the first subset of the first portion is greater than the second subset of the second portion by a second factor, wherein the second factor is determined by dividing the first subset by the second subset, wherein the second factor is less than the first factor, wherein the sum of the first subset and second subset do not encompass the entirety of the plurality of images.

17. The computer program product of claim 16, wherein training a CCNN further comprises:

removing images from the plurality of images to create a second plurality of images comprising the first subset of the first portion and the second subset of the second portion, wherein at least one subsequent CNN is based on the second plurality of images.

18. The computer program product of claim 15, wherein training a first CNN using the plurality of images further comprises:

convoluting a receptive field of at least one image;

establishing an activation map;

applying an activation function to the activation map;

max-pooling the activation map;

computing weights for a next training stage; and determining at least one loss value.

19. The computer program product of claim 15, wherein the plurality of images comprises computed tomography (CT) images, wherein the first portion of the plurality of images comprise CT images indicating no nodules, wherein the second portion of the plurality of images comprise CT images indicating at least one nodule.

20. The computer program product of claim 15, wherein weighting data is based on an output for a datum from at least one previous CNN and a predicted output for the respective datum from a current CNN;

wherein weighting data is further based on an absolute value of the difference between the output for the respective data from the at least one previous CNN and a predicted output for the respective datum from a current CNN.

\* \* \* \* \*